United States Patent [19]

Nelson et al.

[11] Patent Number: 5,451,322
[45] Date of Patent: Sep. 19, 1995

[54] METHOD AND APPARATUS FOR TRITIATED WATER SEPARATION

[75] Inventors: David A. Nelson, Richland; James B. Duncan, Kennewick; George A. Jensen, Richland, all of Wash.

[73] Assignee: Battelle Memorial Institute, Richland, Wash.

[21] Appl. No.: 253,794

[22] Filed: Jun. 3, 1994

[51] Int. Cl.⁶ ............................................. B01D 61/00
[52] U.S. Cl. ..................... 210/653; 210/649; 210/651; 210/490; 210/500.41; 423/249; 423/DIG. 7
[58] Field of Search ............... 210/649, 651, 653, 640, 210/500.27, 490, 500.41; 95/13, 49, 43, 45; 96/4; 423/249, 260, DIG. 7; 204/157.2

[56] References Cited

U.S. PATENT DOCUMENTS

| | | | |
|---|---|---|---|
| 4,190,515 | 2/1980 | Butler et al. | 423/249 |
| 4,637,866 | 1/1987 | Konishi et al. | 423/249 |
| 4,673,549 | 6/1987 | Iniotakis et al. | 423/249 |
| 4,687,644 | 8/1987 | Iniotakis et al. | 423/249 |
| 4,710,204 | 12/1987 | Kraus et al. | 95/49 |
| 4,783,202 | 11/1988 | Kraus et al. | 210/640 |
| 5,066,398 | 11/1991 | Soria et al. | 210/500.27 |
| 5,238,569 | 8/1993 | Soria et al. | 210/500.27 |

OTHER PUBLICATIONS

Harry R. Allcock and Sukky Kwon (Department of Chemistry, The Pennsylvania State University); "An Ionically Cross-Linkable Polyphosphazene: Poly[bis(-carboxylatophenoxy)phosphazene] and Its Hydrogels and Membranes"; Macromolecules 1989, vol. 22, pp. 75-79.

*Primary Examiner*—Robert A. Dawson
*Assistant Examiner*—Ana M. Fortuna
*Attorney, Agent, or Firm*—Paul W. Zimmerman

[57] ABSTRACT

The present invention is a membrane method and apparatus for separating isotopic water constituents from light water. The method involves providing a supported membrane of an aromatic polyphosphazene and pressurizing the water on one side of the membrane thereby forcing the light water through the supported membrane while isotopic water constituents are retained or vice versa. The apparatus of the present invention includes an aromatic polyphosphazene placed on a porous support and means for pressurizing water through the membrane while certain isotopic water constituents are retained.

4 Claims, 1 Drawing Sheet

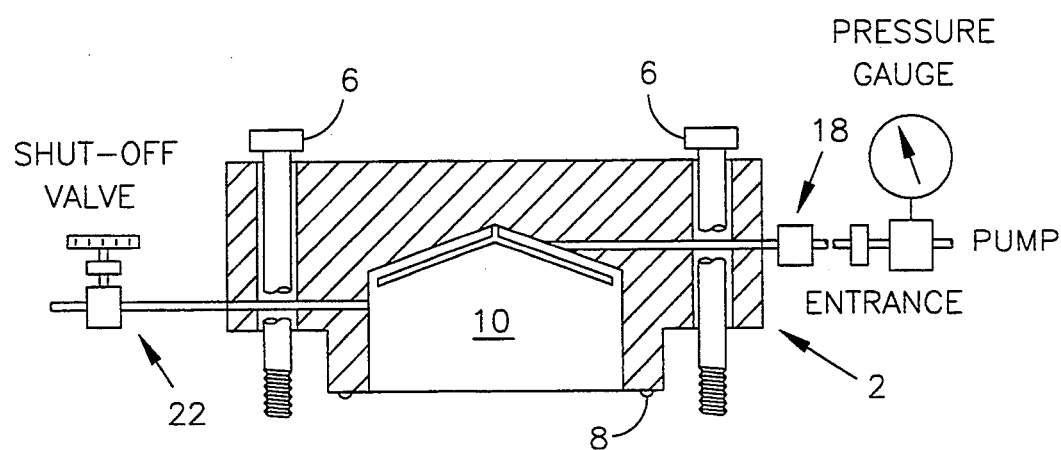
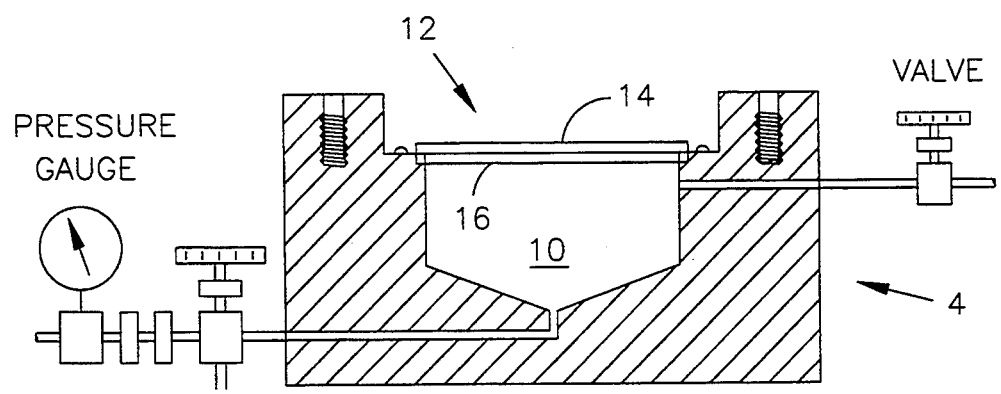

METHOD AND APPARATUS FOR TRITIATED WATER SEPARATION

This invention was made with Government support under Contract DE-AC06-76RLO 1830 awarded by the U.S. Department of Energy. The Government has certain rights in the invention.

FIELD OF THE INVENTION

The present invention relates generally to a method and apparatus for separating tritiated water molecules from a mixture of light water molecules and tritiated water molecules. More specifically, the present invention is an aromatic polyphosphazene membrane that either passes light water molecules while retaining tritiated water molecules or vice versa.

BACKGROUND OF THE INVENTION

Tritiated water, or super-heavy water, can be denoted as HTO, and $T_2O$, wherein H refers to elemental hydrogen, O refers to elemental oxygen, and T or D refer to elemental hydrogen isotopes having either two or one additional neutron(s) respectively in a hydrogen nucleus. Of course, $T_2O$ is unstable in $H_2O$ and generally forms HTO. Tritiated water occurs naturally in very low concentrations. In addition, light water nuclear power plants and nuclear material production facilities produce tritiated water when light water is exposed to ionizing radiation. Light water exposure may be for the purpose of making tritiated water or for heat transfer, cleaning, or any number of applications. An important source of tritiated water is from cooling water of nuclear reactors. Another source is cleanup effluent. It is necessary to process cooling water or cleanup effluent to minimize release of tritiated water into the environment.

Over time, tritiated water has been released from nuclear facilities into the environment at various sites throughout the world and throughout the United States. The released tritiated water makes its way into aquifers or surface waters, thereby making them unfit for drinking or recreation. Although tritiated water at particular sites is in concentrations in excess of safe drinking water standards, its concentrations are below levels considered economical for recovery. For example, at the Hanford site in Washington State, tritium has been measured in the groundwater in concentrations ranging from less than 20,000 pCi/L to over 2,000,000 pCi/L.

Present methods of tritiated water separation include liquid-phase/catalytic exchange, Girdler-Sulfide process, ammonium sequestering, and distillation. All of these processes require significant energy consumption and much capital equipment with attendant high capital and operating costs.

Prior to the present invention, there was no known membrane or membrane process for separating tritiated water from light water. Laboratory work by A. G. Chmeilewski et al. as reported in Journal of Membrane Science, 55, 257 (1989) demonstrated use of cellulose acetate membranes in a pervaporation process separating deuterium oxide from light water. However, Chmeilewski et al. concluded that "the increase in alpha [the separation factor] has not been large enough to warrant further study, at least for purposes of practical application".

Until the advent of the present invention, there was no known membrane method or apparatus for economically separating tritiated water constituents from light water either before or after release of water to the environment.

SUMMARY OF THE INVENTION

The present invention is a membrane method and apparatus for separating tritiated water constituents from light water. The method involves providing a supported membrane of an aromatic polyphosphazene and pressurizing the water on one side of the membrane, thereby forcing the light water through the supported membrane while tritiated water constituents are retained or vice versa.

The apparatus of the present invention includes an aromatic polyphosphazene placed on a porous support and means for pressurizing water through the membrane while certain tritiated water constituents are retained.

Polyphosphazene based polymer membranes were selected because they are chemically resistant to various solvents and are film-forming thermoplastics, (Allcock, H. R., R. L. Kugel, and K. J. Valan, Inorganic Chemistry, 5:1709(1966). In addition, they exhibit thermal stability to 320° C. as reported by Maynard, S. J., T. R. Sharp, and J. F. Haw, in Macromolecules, 24:2794 (1991). Further, they exhibit resistance to radiation as reported by Babic, D., D. M. Souverain, V. T. Stannett, D. R. Squire, G. L. Hagnauer, and R. E. Singler in Radiation Physical Chemistry, 28:169 (1986).

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE FIGURE

FIG. 1 is a cutaway of a membrane test cell.

DESCRIPTION OF THE PREFERRED EMBODIMENT(S)

The present invention is a method of separating tritiated water molecules from light water molecules in a mixture containing a first group of water molecules and a second group of water molecules wherein one of the groups of water molecules is tritiated. The steps of the method are (a) supporting an aromatic polyphosphazene membrane upon a porous substrate; and (b) pressurizing the mixture to a pressure effective to pass the first group of water molecules through the membrane whereas the second group of water molecules is substantially retained by said membrane.

The aromatic polyphosphazene is preferably a poly(diphenoxy)polyphosphazene containing from 0 to about 30% polar group substitute. Preferred polar group substitutes include but are not limited to carboxyl, methoxyl, hydroxyl and esters of a carboxylic acid.

It was discovered that the poly[bis(phenoxy)polyphosphazene] membranes were easier to make and exhibited the desired tritium separation when made with a procedure in which at least two solvents were used. Use of dioxane alone as a solvent leads to temperatures of about 100° C. for reflux leaving an insoluble gel. Moreover, poly(dichloro)phosphazene is not readily soluble in dioxane. On the other hand, dioxane is a preferred coating solvent and it does dissolve sodium phenolate, an intermediate compound made during membrane synthesis.

Benzene is a known carcinogen and is therefore avoided where possible.

Tetrahydrofuran (thf) refluxes at about 60° C. which avoids formation of an insoluble gel, but the polymer modification reaction is slow in thf alone. Thus, it was discovered that careful use of both dioxane and thf produced satisfactory membranes while avoiding the use of benzene and other potentially harmful solvents.

Polymer membranes are preferably made according to the following steps. Poly(dichloro)phosphazene is preferably obtained as a polymer. It is obtainable as a 12% solution in a solvent, or may be prepared from hexachlorocyclotriphosphazene. The polymer in a solvent is obtainable from Ethyl Corporation and the precursor hexachlorocyclotriphosphazene may be obtained from Aldrich Chemical Corp., Milwaukee, Wis. Because this polymer is moisture sensitive, all operations are preferably performed under dry nitrogen in a glove box or under dry nitrogen within sealed glassware. Anhydrous solvents including ethanol, tetrahydrofuran, dioxane, and heptane are obtainable from a variety of sources, including Aldrich Chemical Corp. Solvents are transferred from their sealed containers under dry nitrogen. Sodium hydride is obtained as a 60% by weight suspension in mineral oil. Ethyl 4-hydroxybenzoate and 4-methoxyphenol are also obtainable from a variety of sources including Aldrich Chemical Corp.

Pentane was added to the sodium hydride (NaH)/mineral oil mixture to remove the mineral oil. The sodium hydride was resuspended in an amount of dry dioxane. The amount of dry dioxane was about 100–200 mL.

A reactive mixture is prepared by adding a premixture of dioxane and phenol base along with tetrabutylammonium to the resuspended sodium hydride. For preparation of a small batch of membrane material, about 56 grams (g) of a 60 weight percent (wt %) suspension of sodium hydride can be used. The proportion of premixture dioxane to the sodium hydride resuspension dioxane is about 3:5 by volume and can range from about 1:2 to about 2:1.

The premixture contains a proportion of phenol base to tetrabutylammonium of from about 73:1 by mass to about 75:1 by mass and can range from about 70:1 to about 100:1 by mass. For about 150 mL of dioxane, the amount of tetrabutylammonium is about 0.2 g. The phenol base includes but is not limited to phenol alone, or phenol and 4-methoxyphenol. Upon mixing the premixture and the sodium hydride resuspension, the sodium hydride reacts with the phenol in the phenol base thereby forming sodium phenolate in dioxane solution and evolving hydrogen gas. The sodium phenolate/dioxane solution is light brown in color.

Then a thf polymer solution of poly(dichloro)phosphazene dissolved in thf is prepared and added dropwise to the sodium phenolate/dioxane solution while stirring to make a polymer modification solution. The proportion of thf to premixture dioxane is about 1:1 by volume and may range from about 1:2 to about 2:1.

The polymer modification solution may be refluxed immediately upon mixing or preferably after a time. Because the reaction is exothermic, it is preferred to first stir the polymer modification solution for a time from about 5 minutes to about 1 hour, preferably about 1 hour. It is further preferred that the stirring be done at ambient temperature, about 23° C. and ambient pressure, about 1 atmosphere. Refluxing temperature depends upon the solvent or solvent system. In the preferred case of dioxane and thf in the preferred proportions set out above, the reflux temperature is about 67° C. The thf boils first because of its lower boiling point (about 60° C.) compared to dioxane (about 100° C.). Refluxing is preferably done for about 48 hours. Refluxing can be done from about 12 hours to about 72 hours, an amount of time sufficient to ensure completion of the reaction to produce a modified polymer solution.

The result of the refluxing is the modified polymer solution, specifically a poly(diphenoxy)phosphazene solution, and suspended precipitated sodium chloride. This modified polymer solution containing suspended precipitated sodium chloride is allowed to cool. After cooling, the remaining solution and suspended by-products are removed in a series of steps. The volume of the solvent in the refluxed solution is reduced by about half using a rotary evaporator. The reduced volume solution is poured into an amount of water precipitating the modified polymer. The amount of water should be at least about 5:3 by volume in proportion to the total amount of starting dioxane for removal of the sodium chloride. The precipitated modified polymer was removed from the aqueous solvent and re-dissolved in an amount of thf by stirring for 3 hours at 25° C. making a modified polymer solution. The amount of thf is about double the amount used initially. The re-dissolved modified polymer solution was rotary evaporated to again remove about half the remaining solvent making a modified polymer concentrate. The modified polymer concentrate is then poured into an amount of petroleum ether forming a modified polymer precipitate. The proportion of petroleum ether to thf can be from about 1:2 to about 2:1 by volume, but is preferably about 4:5 by volume.

The modified polymer precipitate is then removed and dried in vacuo. The dried modified polymer precipitate may then be used to form a membrane on a substrate.

EXAMPLE 1—MEMBRANE SYNTHESIS

Membranes were made according to the following steps. Poly(dichloro)phosphazene was obtained as a 12% solution in a solvent. Because this polymer is moisture sensitive, all operations were performed under dry nitrogen in a glove box or under dry nitrogen within sealed glassware. Anhydrous solvents including ethanol, tetrahydrofuran, dioxane, and heptane were obtained from Aldrich Chemical Corp. Solvent were transferred from their sealed containers under dry nitrogen. Sodium hydride was obtained as a 60% by weight suspension in mineral oil. Ethyl 4-hydroxybenzoate and 4-methoxyphenol were obtained from Aldrich Chemical Corp.

Membrane A—Diphenoxypolyphosphazene

Pentane in an amount of 50 mL was added to the sodium hydride (NaH)/mineral oil mixture to remove the mineral oil. The sodium hydride was resuspended in 250 mL of dry dioxane.

A reactive mixture was prepared by adding a premixture of dioxane and phenol along with tetrabutylammonium to the resuspended sodium hydride. The premixture was made with 150 mL dioxane containing 14.6 g (0.155 mole) phenol and 0.2 g tetabutylammonium bromide. Upon combining the premixture with the resuspended sodium hydride, the sodium hydride reacted with the phenol, thereby forming sodium phenolate in dioxane solution and evolving hydrogen gas. The sodium phenolate/dioxane solution was light brown in color. Then a thf polymer solution of 150 mL of a solution of tetrahydrofuran (thf) with 9 g, (0.078 mole) poly(dichloro)phosphazene was prepared and added dropwise to the sodium phenolate/dioxane solution while stirring to make a polymer modification solution. The polymer modification solution was stirred for 1 hour at about 23° C. then refluxed at about 67° C. for an additional 48 hours producing a modified polymer solution, specifically a poly(diphenoxy)phosphazene solution, and suspended precipitated sodium chloride. It was observed that the reaction appeared complete after about 12 hours, but refluxing was continued to ensure completion of the reaction.

After cooling, the volume of the water and suspended sodium chloride in the refluxed solution were reduced by about half using a rotary evaporator. The reduced volume solution was poured into 500 mL of water precipitating the modified polymer. The precipitated modified polymer was removed from solvent and redissolved in 300 mL thf by stirring for 3 hours at 25° C. The re-dissolved modified polymer solution was rotary evaporated to again remove half the remaining solvent then poured into 400 mL of petroleum ether forming a modified polymer precipitate. The modified polymer precipitate was removed and dried in vacuo. The dried modified polymer (14.3 g) represented an 80% yield.

Membrane B—Poly[(carboethoxylatophenoxy)$_X$(phenoxy)$_{(1-X)}$phosphazene]

Membrane B was prepared in a manner similar to Membrane A, but with addition of a polar carboxyl group.

The polar carboxyl group is obtained by addition of a phenolate nucleophile, specifically ethyl 4-hydroxybenzoate to the reactive mixture. All other steps were the same and resulted in a 79% yield of the polymer (14.4 g).

Variations of Membrane B having "X" of about 5 wt %, 10 wt %, 20 wt %, and 30 wt % polar group (carboxyl group) by addition of 1.3 g (0.01 mole), 2.6 g (0.02 mole), 5.2 g (0.04 mole), and 7.8 g (0.06 mole), respectively, of the nucleophile were made.

Membrane C—Poly[(carboxylatophenoxy)$_X$(phenoxy)$_{(1-X)}$phosphazene]

Membrane C was prepared in the same manner as membrane B but with the following additional steps. The polymer product of Membrane B was dissolved into 200 mL of thf. A 4 g mixture of potassium t-butoxide in thf with 0.2 g water was added to the Membrane B/thf solution and stirred for 48 hours at 23° C. After stirring, the solution mixture was poured into 1.0 L of water and acidified to pH 1 to 3 with hydrochloric acid and a Membrane C polymer precipitate formed. The polymer precipitate was washed with water then dried for an overall yield of 80% of the polymer (4.9 g).

Variations in Membrane C, having "X" of about 5 wt %, 10 wt %, 20 wt %, and 30 wt % are achieved by starting with the corresponding variant of Membrane B.

Membrane D—Poly[(4-methoxyphenoxyl)X(phenoxy)(1-X)phosphazene]

Membrane D was made according to the same procedure as Membrane A but with a modified reactive mixture.

The sodium hydride was resuspended in 250 mL thf. A mixture in an amount of 150 mL, the mixture having thf, 13.1 g (0.14 mole) of phenol, 1.9 g (0.01 mole) of 4-methoxyphenol, and 0.2 g tetrabutylammonium bromide was added to the resuspension forming a reactive mixture. After the reaction, hydrogen evolved and a light brown solution remained. Various proportions of 4-methoxyphenoxy are possible. A preferred proportion is an "X" of about 10% by weight.

Membrane E—Poly[4-hydroxyphenoxy)X(phenoxy)(1-X)phosphazene]

Membrane E was made in a manner similar to Membrane D, but with the following additional steps. A solution of 1.8 g (0.018 mole) boron tribromide in 30 mL of anhydrous dichloromethane was treated dropwise with 2.1 g (0.007 mole) of poly[bis(methoxyphenoxy)phosphazene] in 50 mL of dichloromethane forming a reaction mixture. The reaction mixture was stirred at room temperature for 3 hours then poured into 50 mL of water forming a precipitated polymer. The precipitated polymer was reprecipitated with thf and water. The yield was 1.6 g or 84% by weight. Various proportions of 4-hydroxyphenoxy are possible. A preferred proportion is an "X" of about 10% by weight.

Other Membranes

It will be recognized by those skilled in the art of polymer membrane making that although the precursor polydichlorophosphazene from Ethyl Corporation is very useful, it is not essential for the membrane preparation. The precursor polymer is also obtainable by the thermal ring opening of hexachlorocyclotriphosphazene as reported by P. E. Austin, G. H. Riding, and H. R. Allcock, Macromolecules, 16, 719, (1983). Alternatively, as reported by M. Kajiwara, Separation Science Technology, 26, 841, (1991), the sealed glass container in the thermal step of the thermal ring opening may be eliminated by performing the ring opening step in o-dichlorobenzene at 190° C. Other precursor forming routes are given by P. Potin and R. De Jaeger, European Polymer Journal, 27, 341, (1991).

MEMBRANE CASTING TECHNIQUES

A preferred membrane casting technique relies on coating blocks, and doctor blades were obtained from Eastman Kodak, Rochester, N.Y. The coating blocks and doctor blades were capable of providing gate thicknesses from about 2 to about 20 microns. Polyphosphazene modified polymer precipitate is dissolved in p-dioxane within 15–20% by weight polyphosphazene. The solvent p-dioxane is preferred over thf because p-dioxane evaporates rapidly (but slower than thf), yet leaves a homogenous membrane. The polyphosphazene is usually cast as a 20-micron thick solution on a porous substrate. The porous substrate may be polysulfone or polyethylene terephlalate, or other backing having a microporous structure.

It was observed that dioxane/modified polymer precipitate solution tended to strike through the porous backing making an integral composite.

It will be apparent to those skilled in the art of membrane casting that other substrates may include, for example, porous glass, porous wide mesh, and/or large pore supports. However, with glass, handling of the membrane was difficult when the membrane was removed from the glass, and with large pore supports or wide mesh, film support is generally insufficient because relatively large areas of unsupported membrane cannot sustain pressures greater than about 5-10 psi.

It will also be apparent to those skilled in the art that the manual coating technique used herein produces somewhat non-uniform thickness of polymer on the substrate. Automated polymer application equipment can be used to improve the uniformity of the thickness of the polymer membranes upon the substrate.

SEPARATION TECHNIQUE AND EQUIPMENT

Two test cells were used. The first test cell was constructed from cast aluminum (FIG. 1) and was limited to a single pressure of about 48 psi. The second test cell was constructed from a high strength corrosion-resistant polymer, the cell having a 200 mL capacity, obtained from the Amicon Division of W. R. Grace & Co., Beverly, Mass., model 8010 and permitted operation from 10 to 60 psi. Both test cells were operable over the temperature range of from about 2° C. to about 23° C. Operation is not limited to these temperatures, but as a practical matter would not work easily below the freezing point of the water. Of course the freezing point can be depressed by addition of other compounds, but that is not preferred. The upper temperature is limited only by the integrity of the membrane and porous support. The polyphosphazene membrane can withstand temperatures as high as 300° C. It is preferred to operate at the temperature at which the water density is maximum which occurs between about 3° to about 4° C., depending upon the water constituents.

The aluminum test cell is shown in FIG. 1. The test cell is assembled with an upper housing 2 and a lower housing 4 held together by bolts 6 and sealed with o-rings 8. A chamber 10 is defined by assembly of the upper and lower housings 2 and 4. The chamber 10 is divided by the membrane/support 12 having a polymer membrane 14 supported on a porous substrate 16. Isotopic water is introduced through the inlet 18 under pressure. Isotopic water that passes through the membrane 14 is collected through a first exit port 20 while isotopic water retained by the membrane 14 may be accumulated in the portion of chamber 10 above the membrane 14 or drawn off through a second exit port 22.

EXAMPLE 2

Experiments were done according to the present invention to observe the separation performance of the polymer membranes. Experimental data are presented in Tables 1-5, corresponding to membranes A-E, respectively. Most samples exhibit a reduction of tritiated water concentration through the membrane from a starting concentration of about 11.0-11.2 pCi/mL HTO to a final concentration ranging from about 2.9 to 10.9 pCi/mL HTO. Some samples surprisingly exhibit an increase of tritiated water concentration to a final concentration ranging from 10.3 to 16.6 pCi/mL. It was observed that concentration increases occurred for the Membrane D operated at about 4° C., and for the Membrane B operated at about 22° C.

HTO depletion up to about 30% is achievable with membrane B having about 5% carboxyl and operated at 4° C.

Separation results using membrane D at 4° C. showed about a 10% separation.

These separations demonstrate an improvement over previously known membranes that could not separate low concentrations of tritiated water.

CLOSURE

It will be appreciated by those having skill in the art of separation of isotopic water molecules that the present invention requires no pretreatment of the isotopic water containing source, for example removal of catalyst poisons.

While a preferred embodiment of the present invention has been shown and described it will be apparent to those skilled in the art that many changes and modifications may be made without departing from the invention in its broader aspects. The appended claims are therefore intended to cover all such changes and modifications as fall within the true spirit and scope of the invention.

TABLE 1

| | | Membrane A Separation - $PN_x$(diphenoxy) | | | | | | | | | | |
|---|---|---|---|---|---|---|---|---|---|---|---|---|
| | | Final Concentration pCi/mL) | | | | | | | | | | |
| Press. (psi) | Temp. (°C.) | Sample 1 | Sample 2 | Sample 3 | Sample 4 | Sample 5 | Sample 6 | Sample 7 | Sample 8 | Sample 9 | Sample 10 | Sample 11 | Error |
| 48 | 4 | 10.8 | 7.1 | 10.6 | 10.6 | 10.5 | 10.9$^{(A)}$ | — | — | — | — | — | ±0.3 |
| 20 | 5.5 | 10.2 | 10.0 | 12.5 | 9.6 | 10.1 | 9.6 | 10.1 | 9.8$^{(A)}$ | — | — | — | ±0.2 |
| 20 | 12 | 10.0 | 8.4 | 9.5 | 9.0 | 9.7 | 10.3 | 9.8 | 10.3 | 9.4 | 9.6$^{(A)}$ | — | ±0.2 |
| 20 | 23 | 9.5 | 9.0 | 9.3 | 9.2 | 9.8 | 9.6 | 9.3 | 10.1 | 10.1 | 10.0$^{(A)}$ | — | ±0.2 |
| 10 | 23 | 10.4 | 9.4 | 9.8 | 9.7 | 7.3 | 10.3$^{(A)}$ | — | — | — | — | — | ±0.2 |
| 20 | 7 | 10.4 | 10.4 | 8.6 | 9.1 | 9.8 | 7.4 | 7.8 | 8.1 | 8.3 | 10.1 | — | ±0.3 |

$^{(A)}$Top of Membrane

TABLE 2

| | | | Membrane B Separation - $PN_x$(Y% $CO_2Et$) | | | | | | | | | |
|---|---|---|---|---|---|---|---|---|---|---|---|---|
| Membrane Composition | Press. (psi) | Temp. (°C.) | Final Concentration (pCi/mL) | | | | | | | | | |
| | | | Sample 1 | Sample 2 | Sample 3 | Sample 4 | Sample 5 | Sample 6 | Sample 7 | Sample 8 | Sample 9 | Sample 10 | Sample 11 | Error |
| Y = 05% | 60 | 4 | 10.9 | 10.6 | 8.6 | 9.5 | — | — | — | — | — | — | — | ±0.4 |
| Y = 05% | 20 | 2 | 10.2 | 10.3 | 5.2 | — | — | — | — | — | — | — | — | — |
| Y = 10% | 50 | 4 | 10.3 | 9.0 | 10.1 | 10.6 | — | — | — | — | — | — | — | ±0.3 |
| Y = 20% | 50 | 4 | 9.9 | 10.4 | 10.1 | 10.3 | 10.3 | 10.0 | 9.8 | 9.3 | 10.5 | — | — | ±0.3 |
| Y = 30% | 20 | 4 | 10.1 | 10.7 | 10.4 | 10.6 | 10.1 | 10.9 | 10.0 | 10.4 | 9.8 | 9.8 | 10.1 | ±0.3 |

$^{(A)}$Top of Membrane

TABLE 3

Membrane C Separation - $PN_x(Y\% \ CO_2H)$

| Membrane Composition | Press. (psi) | Temp. (°C.) | Sample 1 | Sample 2 | Sample 3 | Sample 4 | Sample 5 | Sample 6 | Sample 7 | Sample 8 | Sample 9 | Sample 10 | Sample 11 | Error |
|---|---|---|---|---|---|---|---|---|---|---|---|---|---|---|
| Y = 05% | 20 | 3 | 10.3 | 8.9 | 10.2 | 9.8 | 10.1 | 10.2 | 9.7 | 7.7 | 9.4 | 10.0(A) | — | ±0.2 |
| Y = 10% | 20 | 3 | 10.4 | 8.7 | 9.9 | 9.8 | 9.5 | 10.2 | 10.1 | 9.9 | 8.3 | 9.8(A) | — | ±0.2 |
| Y = 10% | 48 | 4 | 2.9 | 6.1 | 9.0 | 10.1 | 9.0 | 10.6 | 11.1 | 10.5 | 10.7 | 10.2 | 7.5 | ±0.3 |
| Y = 10% | 48 | 4 | 10.8 | 10.4 | 7.7 | 10.1 | 12.6 | 13.1(A) | — | — | — | — | — | ±0.3 |
| Y = 10% | 48 | 22 | 16.6 | 10.8 | 10.9 | 12.6 | 13.3 | — | — | — | — | — | — | ±0.4 |
| Y = 20% | 50 | 3 | 10.3 | 9.8 | 9.6 | 9.7 | 10.3 | 10.1 | 9.6 | 8.7 | 9.7 | — | — | ±0.4 |
| Y = 20% | 60 | 4 | 10.4 | 9.7 | 9.2 | 9.4 | 10.3(A) | — | — | — | — | — | — | — |
| Y = 20% | 50 | 5 | 8.2 | 9.7 | 9.1 | 10.6 | 9.9 | 10.3 | 9.5 | 10.0 | 10.1 | 9.7 | — | — |
| Y = 20% | 20 | 6 | 10.2 | 10.2 | 10.4 | 10.2 | 10.3 | 10.3 | 10.0 | 10.5 | 10.6 | 10.3 | 10.9(A) | — |

(A)Top of Membrane

TABLE 4

Membrane D Separation - $PN_x(Y\% \ OMe)$

| Membrane Composition | Press. (psi) | Temp. (°C.) | Sample 1 | Sample 2 | Sample 3 | Sample 4 | Sample 5 | Sample 6 | Sample 7 | Sample 8 | Sample 9 | Sample 10 | Sample 11 | Error |
|---|---|---|---|---|---|---|---|---|---|---|---|---|---|---|
| Y = 10% | 48 | 4 | 12.3 | 12.8 | 12.6 | 13.4 | 9.9 | 12.7 | 13.1(A) | — | — | — | — | ±0.4 |

(A)Top of Membrane

TABLE 5

Membrane E Separation - $PN_x(Y\% \ OH)$

| Membrane Composition | Press. (psi) | Temp. (°C.) | Sample 1 | Sample 2 | Sample 3 | Sample 4 | Sample 5 | Sample 6 | Sample 7 | Sample 8 | Sample 9 | Sample 10 | Sample 11 | Error |
|---|---|---|---|---|---|---|---|---|---|---|---|---|---|---|
| Y = 10% | 48 | 4 | Terminated - no permeation of water through membrane after 10 minutes | | | | | | | | | | | |
| Y = 10% | 50 | 2 | 9.7 | 9.9 | 10.0 | 10.0 | 9.4 | 10.1 | 10.6 | — | — | — | — | ±0.4 |

We claim:

1. A method of separating tritiated water molecules from light water molecules in a mixture containing a first group of water molecules and a second group of water molecules wherein one of the groups of water molecules is tritiated, comprising the steps of:
   (a) supporting a poly(diphenoxy)polyphosphazene membrane upon a porous substrate; and
   (b) pressurizing said mixture to a pressure wherein said first group of water molecules is substantially retained by said membrane and said second group of water molecules substantially passes through said membrane.

2. The method as recited in claim 1, wherein the diphenoxy polyphosphazine membrane contains a side group.

3. The method as recited in claim 2, wherein the side group is selected from the group consisting of carboxy, carboethoxy, methoxy, and hydroxy groups.

4. The method as recited in claim 1, wherein the porous substrate is polysulfone.

* * * * *